United States Patent
Hasegawa

(10) Patent No.: US 6,229,601 B1
(45) Date of Patent: *May 8, 2001

(54) COORDINATE INPUT APPARATUS AND METHOD, AND STORAGE MEDIUM

(75) Inventor: Masahide Hasegawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,351

(22) Filed: Jan. 25, 1999

(30) Foreign Application Priority Data

Jan. 30, 1998  (JP) ................................... 10-019506

(51) Int. Cl.[7] ............................. G01C 1/00; G01B 11/26; G01F 11/14; H03M 1/22
(52) U.S. Cl. ........................ 356/141.5; 341/5; 356/375
(58) Field of Search ..................... 341/5; 356/141.2, 356/141.5, 400, 375

(56) References Cited

U.S. PATENT DOCUMENTS 4,274,735 * 6/1981 Tamura et al. .
4,688,933 * 8/1987 Lapeyre .
4,782,328 * 11/1988 Denlinger .
5,394,183   2/1995 Hyslop ........................................ 348/88
5,499,098   3/1996 Ogawa ........................................ 356/375
5,694,495   12/1997 Hara et al. ................................. 382/324

FOREIGN PATENT DOCUMENTS 197 57 674   7/1998 (DE) .
0 484 160    5/1992 (EP) .
6-274266     9/1994 (JP) .
7-76902      8/1995 (JP) .
2503182      3/1996 (JP) .

* cited by examiner

Primary Examiner—Stephen C. Buczinski
(74) Attorney, Agent, or Firm—Fitzpatrick, Cella, Harper & Scinto

(57) ABSTRACT

This invention provides a high-resolving-power, compact, lightweight, low-cost coordinate input apparatus which suppresses the influence of disturbance light. Signals in light emission and non-light emission states of a light spot flashed by a designation unit in a predetermined cycle are detected by sensors of a coordinate detection unit, and separately integrated by an integration means to obtain a difference signal. The difference signal is input to a coordinate arithmetic means and digitized at a data width of n bits or more to perform coordinate calculation, thereby outputting a coordinate value having a resolving power about the nth power of 2 of the number of sensor pixels.

17 Claims, 12 Drawing Sheets

COORDINATE INPUT APPARATUS AND METHOD, AND STORAGE MEDIUM

BACKGROUND OF THE INVENTION

1. Field of the Invention

The present invention relates to a coordinate input apparatus used to control an externally connected computer or write characters and graphics by directly inputting coordinates on a display screen with a designation unit.

2. Related Background Art

Known examples of a conventional coordinate input apparatus are one for sensing a light spot on a screen using a CCD area sensor or linear sensor, and calculating and outputting coordinate values by image processing using barycentric coordinates or pattern matching, and one using a position detection element (analog device capable of obtaining an output voltage corresponding to a spot position) called a PSD (Position Sensitive Detector).

For example, Japanese Patent Publication No. 7-76902 discloses an apparatus for sensing a light spot of a parallel beam of visible light with a video camera to detect coordinates, and at the same time sending/receiving control signals by infrared diffusion light. Japanese Patent Application Laid-Open No. 6-274266 discloses an apparatus for detecting coordinates using a linear CCD sensor and a special optical mask.

Japanese Patent No. 2,503,182 discloses the arrangement of an apparatus using a PSD, and an output coordinate correction method therefore.

In resent years, the screen of a large-screen display has higher brightness, can be satisfactorily used even in a bright illumination environment, and is much in demand. Along with this, a coordinate input apparatus must be more resistant to disturbance light so as to be used in such an environment together with the large-screen display. Recently, devices using infrared rays as radio communication means increase in number. Since disturbance light is increasing in addition to infrared light and visible light, high resistance to disturbance light is one of the important characteristics of the apparatus.

However, as is apparent from Japanese Patent Publication No. 7-76902 and Japanese Patent Application Laid-Open No. 6-274266, an apparatus using a conventional CCD sensor can suppress disturbance light by only an optical filter. To the contrary, an apparatus using a PSD, like the one disclosed in Japanese Patent No. 2,503,182, can suppress the influence of disturbance light by frequency-modulating the light intensity and synchronously detecting the modulated wave. This apparatus is resistant to disturbance light with the use of an optical filter.

In a large-screen display, resolution is increased in addition to brightness. The resolving power of the coordinate input apparatus must also be increased, which cannot be attained in an apparatus using a PSD. This is because the dynamic range of a sensor output voltage directly corresponds to the input range. For example, when the entire screen is divided into 1,000 coordinates, the S/N ratio must be at least 60 dB or more. Further, since linear errors must be digitally corrected, as disclosed in Japanese Patent No. 2,503,182, a high-precision analog circuit, multi-bit AD converter, and arithmetic circuit are required. Since the S/N ratio of a sensor output signal depends on the light quantity and the sharpness of a light spot, only suppression of disturbance light is insufficient, and a bright, high-precision optical system is also required. Accordingly, the apparatus itself increases in cost and size.

As a method of increasing the resolving power using a CCD sensor, Japanese Patent Publication No. 7-76902 discloses simultaneous use of a plurality of video cameras. However, this increases the apparatus size and cost. Using one video camera having many pixels further increases the apparatus size and cost, compared to using a plurality of cameras. To attain a higher resolving power than the number of pixels by image processing, an enormous amount of image data must be processed at a high speed. To operate the apparatus in real time, its size and cost greatly increase.

In Japanese Patent Application Laid-Open No. 6-274266, a high resolving power is obtained by a special optical mask and signal processing. The resolving power can be increased so long as disturbance light is reduced and a high S/N ratio is ensured. In practice, in a linear sensor, a formed image is linear and cannot be separated from disturbance light within a plane, compared to an area sensor forming a point image. For this reason, the linear sensor is readily affected by disturbance light and can only be practically used in a specific environment almost free from disturbance light.

SUMMARY OF THE INVENTION

It is an object of the present invention to provide a high-resolving-power, high-performance coordinate input apparatus which suppresses the influence of disturbance light.

It is another object of the present invention to provide a compact, low-cost coordinate input apparatus.

According to an aspect of the present invention, there is provided a coordinate input apparatus which irradiates a predetermined position on a coordinate input screen with light from a designation unit to form a light spot, and detects the light spot by a coordinate detection unit to generate a coordinate output signal corresponding to the predetermined position on the coordinate input screen, comprising light emitting control means, arranged in the designation unit, for flashing the light spot in a predetermined cycle, integration means arranged in the coordinate detection unit and constituted by a sensor array prepared by aligning in a line a plurality of photoelectric conversion sensors for detecting the light spot, and a ring-like charge transfer portion for separately integrating signals in light emission and non-light emission states output in synchronism with the predetermined cycle of the light spot from the sensor array, image sensing means arranged in the coordinate detection unit and having difference means for obtaining a difference signal from the signals in light emission and non-light emission states, and coordinate arithmetic means for digitizing the difference signal between light emission and non-light emission states output from the image sensing means at a data width not less than n bits to perform coordinate calculation, thereby calculating a coordinate value having a resolving power substantially the nth power of 2 of the number of pixels of the sensor array.

DETAILED DESCRIPTION OF THE PREFERRED EMBODIMENTS

Figure 1:
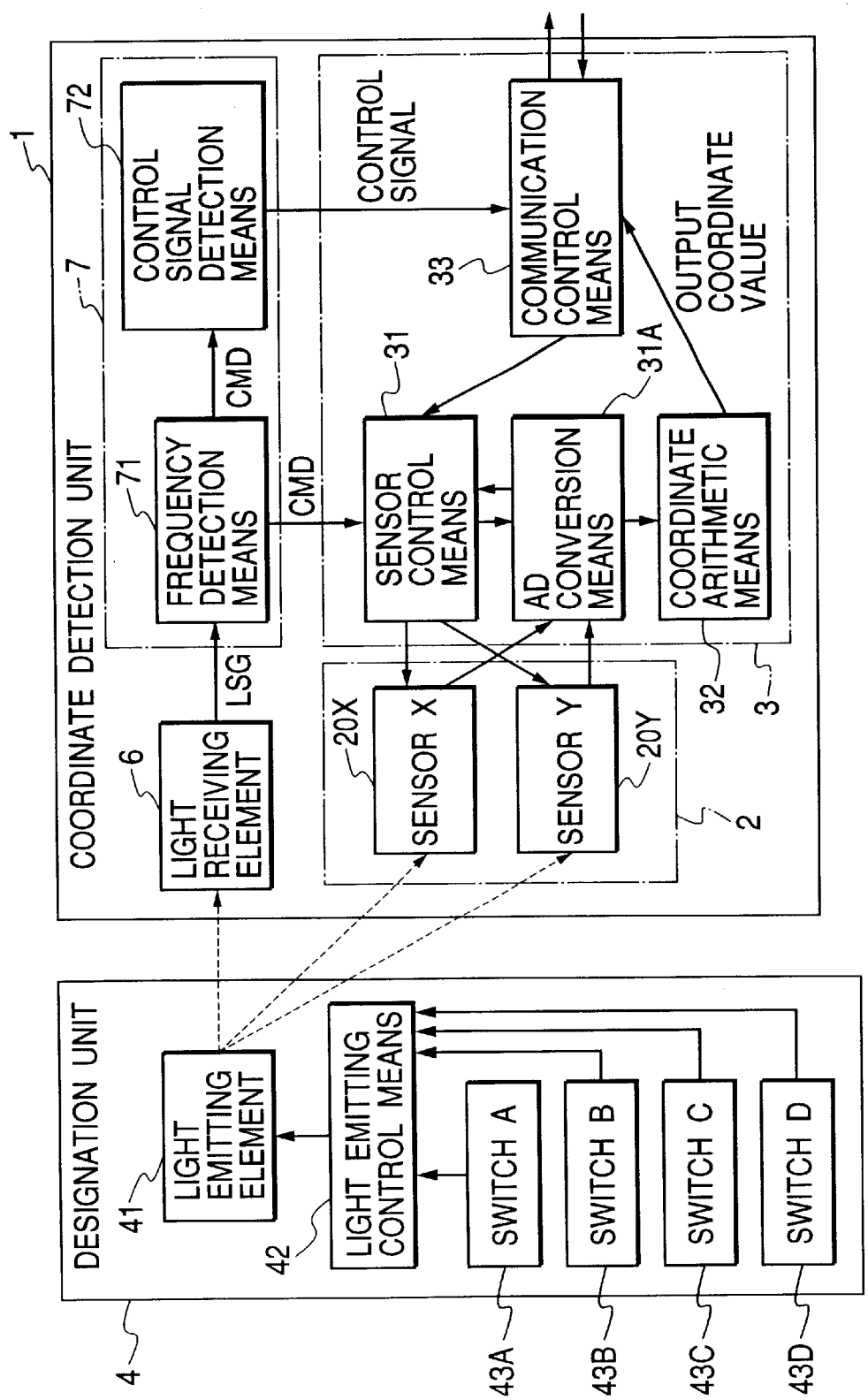
FIG. 1 is a block diagram showing the internal arrangement of a coordinate input apparatus according to the first embodiment of the present invention.

Embodiments of the present invention will be described in detail below with reference to the accompanying drawings.
(First Embodiment)
The first embodiment of the present invention will be described with reference to FIGS. 1 to 12.
(Arrangement of Apparatus)
The schematic arrangement of an optical coordinate input apparatus according to the present invention will be described with reference to FIGS. 1 to 5. FIG. 2 shows the whole arrangement of the optical coordinate input apparatus. This apparatus is mainly constituted by a designation unit 4 for forming a light spot on a screen 10, a coordinate detection unit 1 for detecting the light spot, and a projection display device 8 for projecting an image on the screen 10.
(Projection Display Device)
The arrangement of the projection display device 8 will be explained.

In FIG. 2, the projection display device 8 comprises an image signal processing portion 81 for receiving an image signal from a display signal source as an externally connected device such as a computer (not shown), an illumination optical system which is controlled by the image signal processing portion 81 and made up of a liquid crystal panel 82, a lamp 83, a mirror 84, and a condenser lens 85, and a projection lens 86 for projecting an image of the liquid crystal panel 82 on the screen 10. With this arrangement, a desired image can be displayed on a large screen.

A light beam emitted by the designation unit 4 is incident on the large screen 10 to form a light spot 5. The screen 10 has a proper light diffusion property in order to widen the observation range of a projected image. A light beam from the designation unit 4 is diffused at the position of the light spot 5. Therefore, part of the light diffused at the position of the light spot 5 is incident on the coordinate detection unit 1 regardless of the position on the screen and the direction of the light beam.
(Coordinate Detection Unit)
The arrangement of the coordinate detection unit 1 will be explained.

In FIG. 2, the coordinate detection unit 1 is constituted by a coordinate detection sensor portion 2, a controller 3 for controlling this sensor portion and calculating coordinates, a light receiving element 6, and a signal processing portion 7. The coordinate detection unit 1 detects a coordinate signal of the light spot 5 on the screen 10 and a control signal corresponding to the state of each switch of the designation unit 4, and communicates them to the externally connected device (not shown) via the controller 3. This allows with the designation unit 4 to write characters and line drawings on the screen 10 and freely perform input operation such as button operation and selection/determination of icons.

Figure 2:
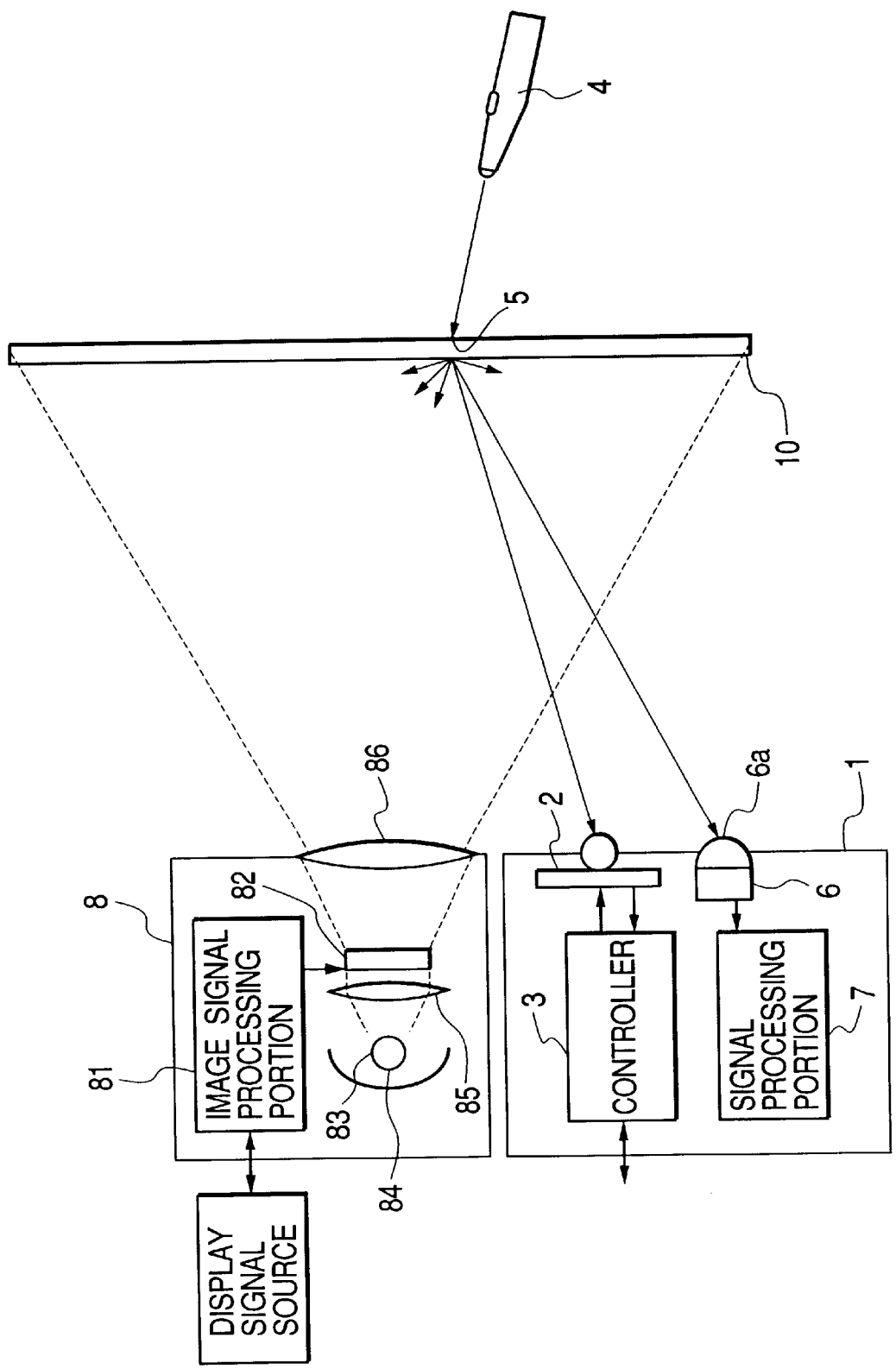
FIG. 2 is a plan view showing the whole arrangement of the coordinate input apparatus in use.

FIG. 1 shows the internal arrangement of the coordinate detection unit 1. The coordinate detection unit 1 comprises the light receiving element 6 for detecting the light quantity with a condensing optical system at a high sensitivity, and two linear sensors 20X and 20Y which detect the incoming direction of light with an imaging optical system. The coordinate detection unit 1 receives diffusion light from the light spot 5 formed on the screen 10 by a light beam from the designation unit 4.

The light receiving element 6 has a condenser lens 6a serving as a condensing optical system, which detects the light quantity of a predetermined wavelength at a high sensitivity from the entire range on the screen 10. A detection output is detected by a frequency detection means 71 and is demodulated by a control signal detection means 72 into a digital signal including data such as a control signal (signal superposed by a light emitting control means 42 of the designation unit 4).

Figure 3:
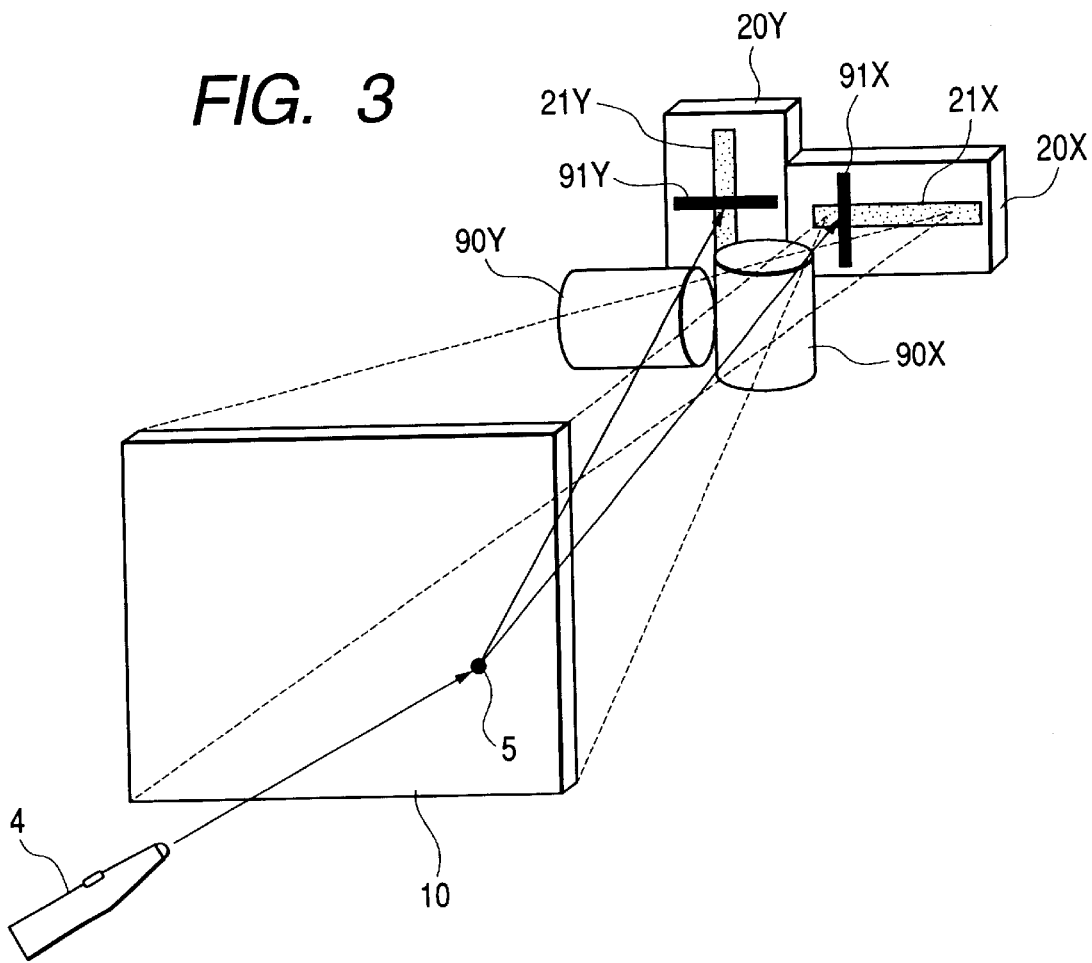
FIG. 3 is a perspective view showing the layout of linear sensors.

FIG. 3 shows the layout of the two linear sensors 20X and 20Y. An image of the light spot 5 is formed into linear images 91X and 91Y on photosensitive portions 21X and 21Y of the respective sensors via cylindrical lenses 90X and 90Y serving as imaging optical systems. By accurately arranging the two sensors at a right angle, they can obtain outputs having a peak at a pixel reflecting X and Y coordinates. These two sensors are controlled by a sensor control means 31 in FIG. 1. The output signals are sent to a coordinate arithmetic means 32 as digital signals via an AD conversion means 31A and calculated into output coordinate values.

The output coordinate values from the coordinate arithmetic means 32 and data such as a control signal from the control signal detection means 72 are input to a communication control means 33 and transmitted to the externally connected device (not shown) by a predetermined communication method. A mode switching signal is sent to the sensor control means 31 and coordinate arithmetic means 32 via the communication control means 33 in order to perform operation different from normal operation, such as adjustment (e.g., to set a user calibration value).

Figure 4:
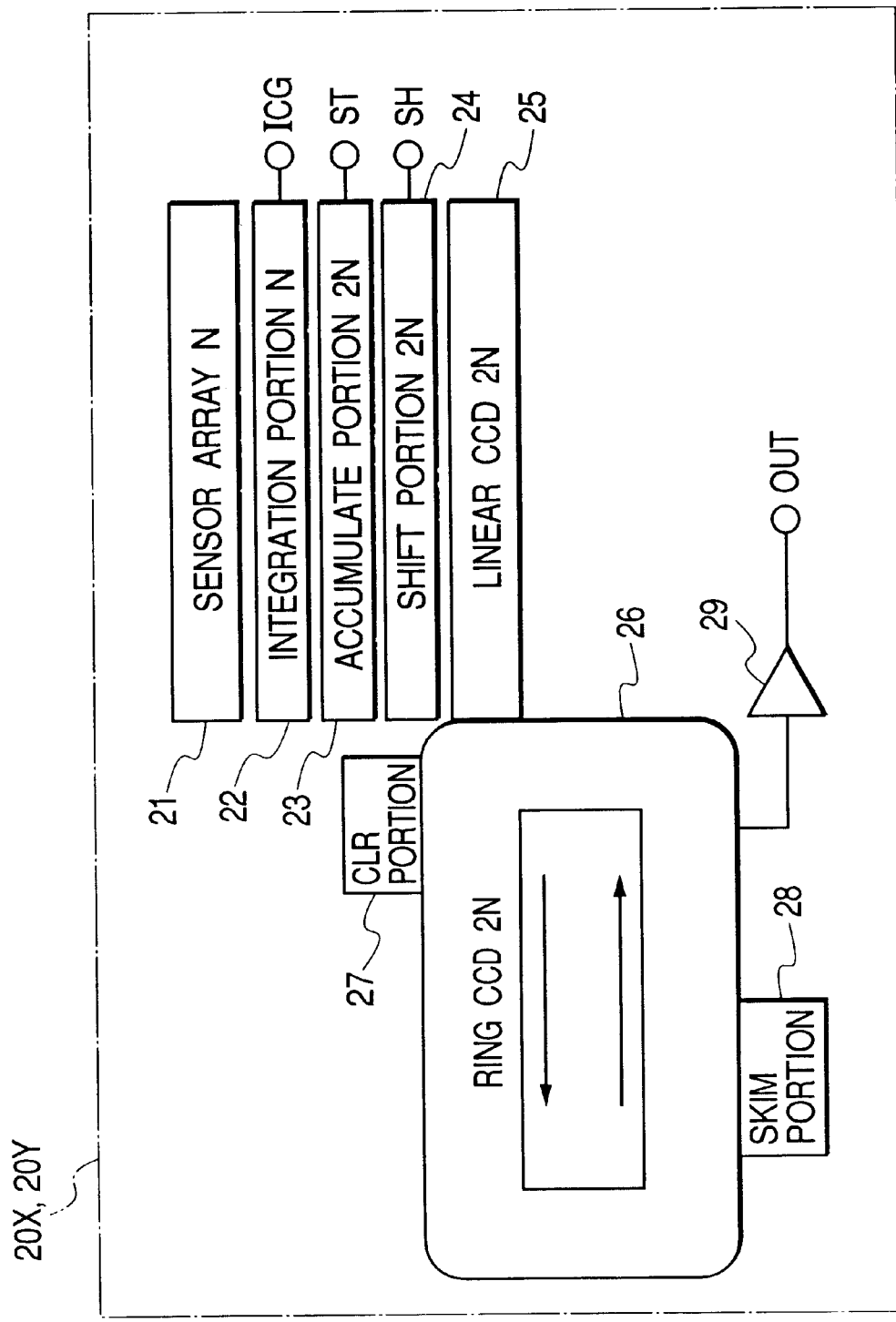
FIG. 4 is a block diagram showing the internal arrangement of the linear sensor.

FIG. 4 shows the internal arrangement of the linear sensors 20X and 20Y. The linear sensors 20X and 20Y are arrayed and can perform synchronous integration. Note that the two sensors for X and Y coordinates have the same arrangement, and only one sensor will be described.

A sensor array 21 serving as a light receiving portion is made up of N pixels. Electrical charges corresponding to the light reception amount are accumulated in N integration portions 22. The integration portions 22 realize electron shutter operation because they can be reset by applying a voltage to a gate ICG. The electrical charges accumulated in the integration portions 22 are transferred to 2N accumulate portions 23 by applying a pulse voltage to an electrode ST. The electrical charges are separately accumulated in the accumulate portions 23 in correspondence with H (High-level) and L (Low-level) states of a signal LCK which synchronizes with flashing of light. The electrical charges separately accumulated in synchronism with flashing of light are transferred to 2N linear CCD portions 25 via 2N shift portions 24 arranged for simplifying a transfer clock.

The electrical charges corresponding to flashing of light output from the N-pixel sensor are stored adjacent to each other in the linear CCD portions 25. The electrical charges in the linear CCD portions 25 are sequentially transferred to 2N ring CCD portions 26. The ring CCD portions 26 are reset by a CLR portion 27 in accordance with a signal RCL, and then sequentially accumulate the electrical charges from the linear CCD portions 25. The electrical charges accumulated in this manner are read out by an amplifier 29. The amplifier 29 non-destructively outputs a voltage proportional to the accumulated charge amount. In practice, the amplifier 29 amplifies and outputs the difference between adjacent charge amounts, i.e., the value obtained by subtracting a charge amount in a light emission state from a charge amount in a non-light emission state.

(Designation Unit)

The arrangement of the designation unit 4 will be explained.

In FIG. 1, the designation unit 4 incorporates a light emitting element 41 formed from a semiconductor laser for emitting a light beam, the light emitting control means 42 for controlling to drive light emission, and four manipulation switches 43A to 43D. The light emitting control means 42 controls emission of light superposed with a control signal in accordance with the states of the four manipulation switches 43A to 43D by the ON/OFF operation of light emission and a modulation method (to be described later).

Figure 5:
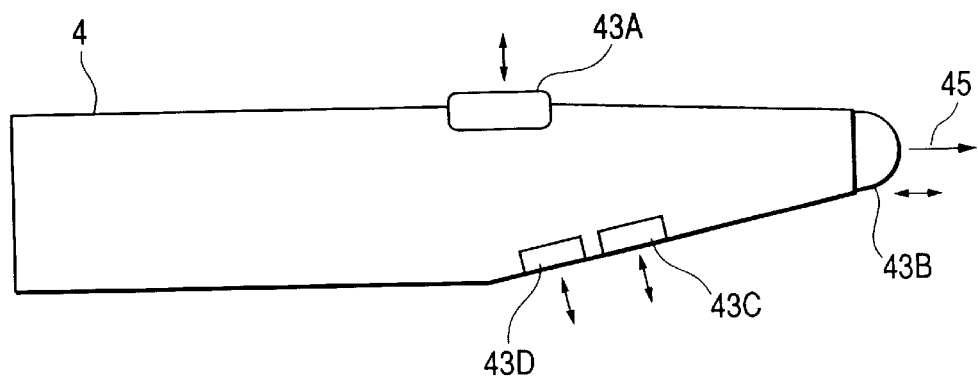
FIG. 5 is a perspective view showing the outer appearance of a designation unit.

FIG. 5 is a view showing the outer appearance of the designation unit 4. Table 1 shows the operation mode of the designation unit 4. In Table 1, switches A to D respectively correspond to the switches 43A to 43D in FIG. 5. In this case, "light emission" corresponds to a light emission signal (coordinate signal), and "pen-down" and "pen button" correspond to control signals.

TABLE 1

| Switch A | Switch B | Switch C | Switch D | Light Emission | Pen-Down | Pen Button |
|---|---|---|---|---|---|---|
| x | x | — | — | OFF | OFF | OFF |
| o | x | x | x | ON | OFF | OFF |
| o | x | o | x | ON | ON | OFF |
| o | x | x | o | ON | OFF | ON |
| o | x | o | o | ON | ON | ON |
| o | o | — | — | ON | ON | ON |
| x | o | — | — | ON | ON | OFF |

The operator grips the designation unit 4 to direct its distal end toward the screen 10. The switch 43A is attached to a position where the thumb naturally touches it, and the operator depresses the switch 10 to emit a light beam 45. Then, a light spot 5 is formed on the screen 10, and a coordinate signal is output by predetermined processing. In this state, pen-down and pen button control signals are OFF. For this reason, only a designation position is explicitly indicated to the operator by movement of the cursor or highlight switching on the screen 10.

When the operator depresses the switches 43C and 43D attached to positions where the index and middle fingers naturally touch them, pen-down and pen button control signals are superposed on a light emission signal, as shown in Table 1. More specifically, the operator depresses the switch 43C to set a pen-down state, and can execute screen control to start inputting characters and line drawings or to select and determine buttons. The operator depresses the switch 43D to set a pen button state in correspondence with an optional function such as menu calling. This allows the operator to easily perform operation, for example, to quickly, accurately write characters and graphic or select buttons and menus at arbitrary positions on the screen 10 with one hand.

The switch 43B is attached to the distal end of the designation unit 4. This switch 43B is turned on by pressing the designation unit 4 against the screen 10. While the operator grips the designation unit 4 like a pen and the index finger is at the position of the switch 10, the operator presses the designation unit 4 against the screen 10 to set a pen-down state by the switch 43B. The operator can perform natural pen input operation without redundant button operation. The switch 43A also functions as a pen button. As a matter of course, if the operator depresses the switch 43A without pressing the designation unit 4 against the screen, the operator can move only the cursor. In practice, when the operator directly touches the screen, characters and graphics can be input with higher operability and accuracy than when the operator is apart from the screen. The first embodiment realizes natural, comfortable operation using the four switches even when the operator is apart from or near the screen. The designation unit 4 can be properly used as the case may be.

Note that these switches can be separately used. Particularly for only direct input, a diffusion light source can replace a light beam, and an LED lower in cost and longer in service life than a semiconductor laser can be adopted.

The light emitting control means 42 is set to transmit a unique ID number together with a control signal in consideration of the case of using two, proximity and remote designation units 4, the case of simultaneously using designation units 4 by two or more persons, or the case of using a plurality of designation units 4 different in attribute such as color and thickness. Attributes such as the thickness and color of a line to be drawn are determined by software or the like on the externally connected device side in correspondence with the transmitted ID number. Settings can be changed by buttons and menus on the screen 10. This operation may also be achieved by attaching another manipulation switch or the like to the designation unit 4 and transmitting a change designation signal. As for these settings, the state can be held in the designation unit 4 or coordinate detection unit 1, and attribute information can be transmitted to the externally connected device in place of the ID number.

In this case, the designation unit 4 or coordinate detection unit 1 must be equipped with a setting data holding mechanism. This mechanism is convenient because attributes can be switched at once when one designation unit is used by two or more apparatuses, or settings can be shared when an image is displayed on the screens of a plurality of externally connected devices.

Such an additional manipulation button can be set to realize another function, e.g., to flash a display device, switch a signal source, or operate a picture recording device. Further, a pressure detection means may be added to either or both of the switches 43A and 43B to detect the writing pressure and transmit the writing pressure data together with a control signal. In this way, various useful signals can be transmitted.

Detailed operation of this apparatus will be described with reference to FIGS. 6 to 12.

(Demodulation of Control Signal)

Operation of decoding a control signal from an output signal of the light receiving element 6 will be explained.

Figure 6:
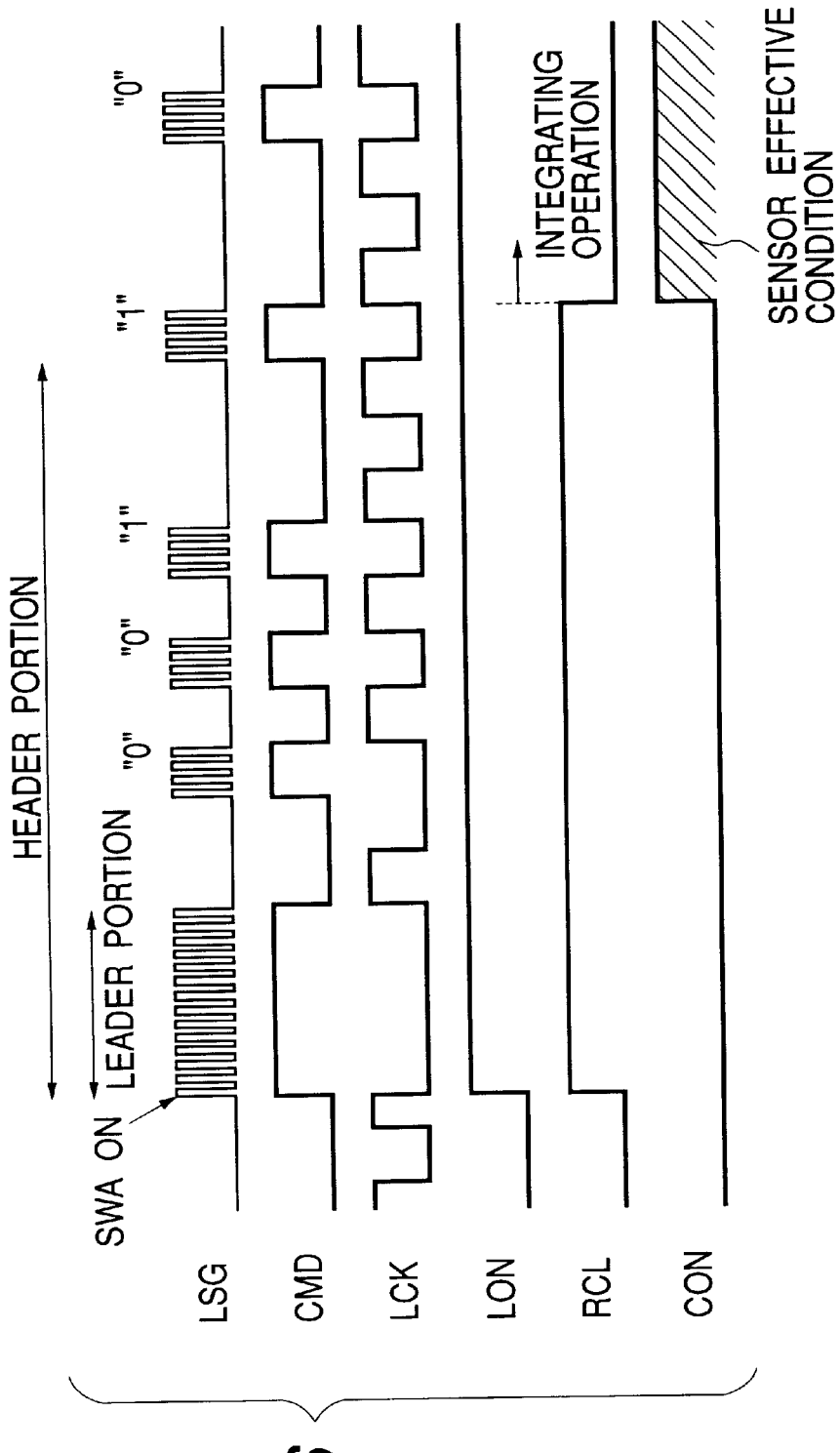
FIG. 6 is a timing chart of signal waveforms representing operation of decoding a control signal from an output signal of a light receiving element.

FIG. 6 is a timing chart for explaining the decoding of a control signal. When the switch 43A or 43B of the designation unit 4 is turned on, light emission starts. Then, signals of a leader portion made of a relatively long, continuous pulse sequence, and a subsequent header portion made of codes (e.g., a manufacturer ID) are output first. After that, transmission data sequences made of a pen ID, control signal, and the like are sequentially transmitted in a predetermined order and format. In each data bit, bit "1" is formed in a modulation format with an interval twice that of bit "0".

A data signal formed from such a bit sequence is detected by the light receiving element 6 shown in FIG. 1. An optical output signal LSG detected by the light receiving element 6 is detected by the frequency detection means 71. The frequency detection means 71 synchronizes with the pulse cycle of the first frequency which is the highest of all optical output signals LSG. The frequency detection means 71 demodulates a modulated signal CMD using an optical filter without any influence of disturbance light.

This detection method is the same as in a widely spread infrared remote controller and is a highly reliable radio communication method. This embodiment employs as the first frequency 60 kHz in a higher band than in the general infrared remote controller, and thus a malfunction can be prevented even if the infrared remote controller is simultaneously used. The first frequency can be set in the same band as in the general infrared remote controller. In this case, a malfunction can be prevented by identifying the apparatus and controller by IDs or the like.

The modulated signal CMD detected by the frequency detection means 71 is interpreted as digital data by the control signal detection means 72, and decoded into a control signal such as the above-described pen-down or pen button control signal. The decoded control signal is sent to the communication control means 33.

As for data encoding, various methods can be used. The average light quantity is desirably constant to detect coordinates, and the magnitude of the clock component is desirably large to perform PLL locking, as described below. Since a data amount to be transmitted is not so large, a relatively high redundancy does not pose any problem. Considering these points, in this embodiment, 6-bit (64) data are assigned to 108 10-bit codes using "1"s and "0"s equal in number and a "1" or "0" successive number of 3 or less. According to this encoding method, since the average power is made constant, and a sufficient clock component is included, a stable sync signal can be easily generated. This encoding method is often used in a magnetic recording/reproduction device and the like. The same method can easily realize both encoding and decoding.

Although each of pen-down and pen button control signals is made of 2 bits, as described above, another long data such as an ID must be transmitted. In the first embodiment, one block data is constructed from 24 bits by arranging a control signal for first 2 bits, a content identification code for next 2 bits (e.g., 00 for a writing pressure signal or 11 for an ID), their parities for second next 2 bits, and 16-bit data and a 2-bit parity. This data is encoded into a 40-bit signal by the above method. A 10-bit sync code is added to the head of the 40-bit signal. This sync code uses a special code having 4 successive "0"s and 5 successive "1"s or an inverted pattern (switched depending on whether the end of a preceding block is "1" or "0"), and can be easily identified from a data word. Even in the middle of a data sequence, the position of the sync code can be reliably identified to decode data. Therefore, a transmission signal having one 50-bit block is attained, and a control signal and 16-bit data such as ID or writing pressure data are transmitted.

In the first embodiment, the second frequency is set to 7.5 kHz which is ⅛ the first frequency of 60 kHz. However, since the above encoding method is employed, the average transmission bit rate is 5 kHz which is ⅔ the second frequency. Further, since one block is made of 50 bits, data having one 24-bit block is transmitted at 100 Hz. The effective bit rate except for parities is 2,000 bits/sec. In this way, the redundancy is high, but synchronization can be easily established with a very simple arrangement while preventing erroneous detection. By using both a phase lock signal for sensor control (to be described below) and a check for the repetitive cycle of the sync code, the signal can be followed even when a short dropout occurs. Such a dropout can be reliably identified by the presence/absence of a header signal from quick operation such as pen-up or double tap operation.

(Sensor Control)

Phase lock of the linear sensors 20X and 20Y will be explained.

A code modulation cycle as the second frequency which is included in the modulated signal CMD is detected by the sensor control means 31. The detected signal is used to control the linear sensors 20X and 20Y.

More specifically, the sensor control means 31 is reset at the timing of the header portion shown in FIG. 6, and generates a signal LCK phase-locked with the trailing edge of the modulated signal CMD. From the generated signal LCK, the sensor control means 31 attains a signal having a predetermined frequency in synchronism with the presence/absence of light emission. From the modulated signal CMD, the sensor control means 31 generates a signal LON representing the presence/absence of an optical input, and a sensor reset signal RCL which rises in synchronism with the signal LON. While the sensor reset signal RCL is at high level, the two linear sensors 20X and 20Y are reset. Synchronous integrating operation (to be described later) starts at the trailing edge timing of the sensor reset signal RCL which synchronizes with the leading edge of the signal LCK.

The control signal detection means 72 detects a header portion. When the control signal detection means 72 confirms the start of input from the designation unit 4 other than input from another device or noise, the communication control means 33 transmits a signal representing the confirmation to the sensor control means 31. A signal CON representing an effective condition of operation of the linear sensors 20X and 20Y is set to high level, and the coordinate arithmetic means 32 starts operating.

Figure 7:
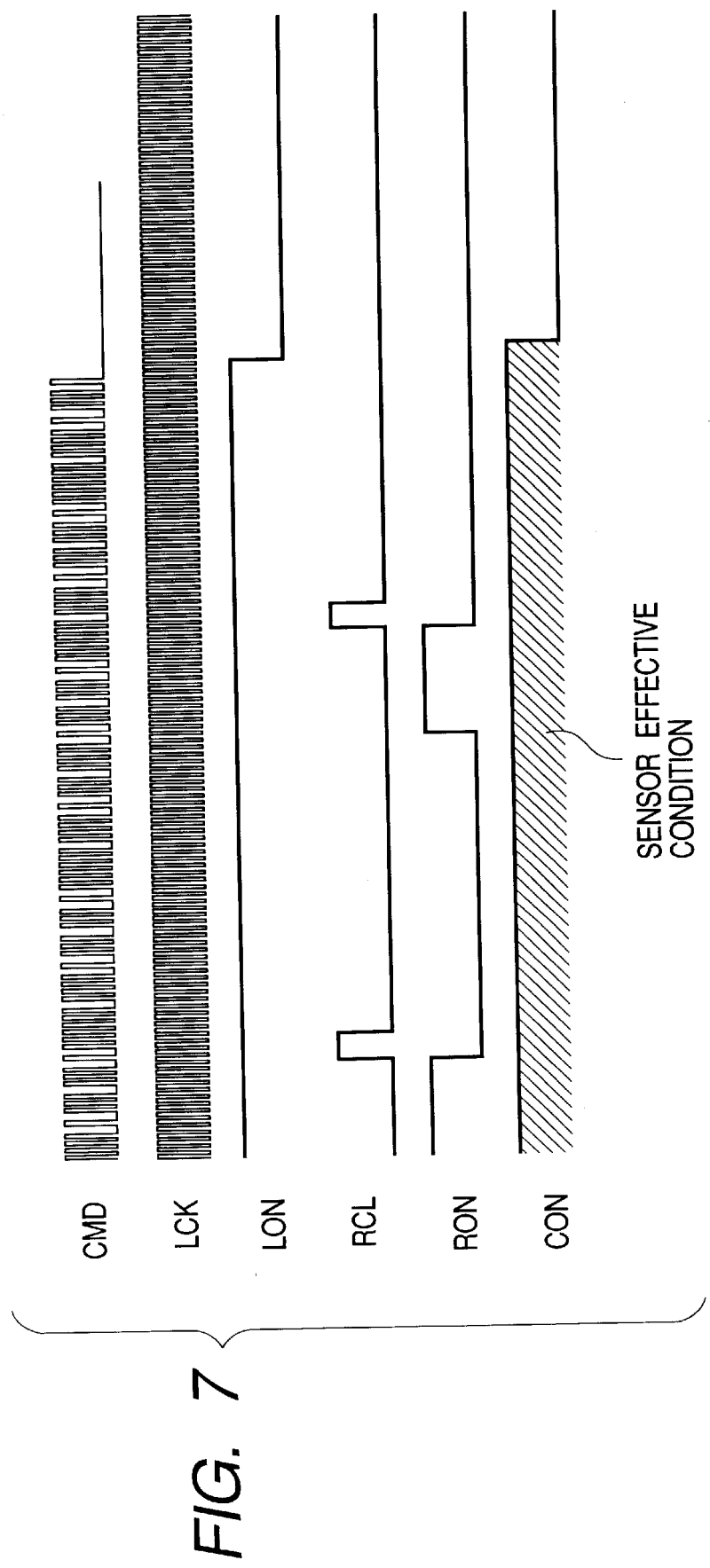
FIG. 7 is a timing chart at the end of a series of operations of decoding a control signal from an output signal of the light receiving element.

FIG. 7 is a timing chart when no optical output signal LSG is output, and a series of operations end. If the modulated signal CMD detected from the optical output signal LSG is kept at low level for a predetermined time or more, the signal LON representing the presence/absence of an optical input changes to low level, and the signal CON representing the effective condition of sensor operation also changes to low level. As a result, the linear sensors 20X and 20Y end coordinate output operation.

Figure 8:
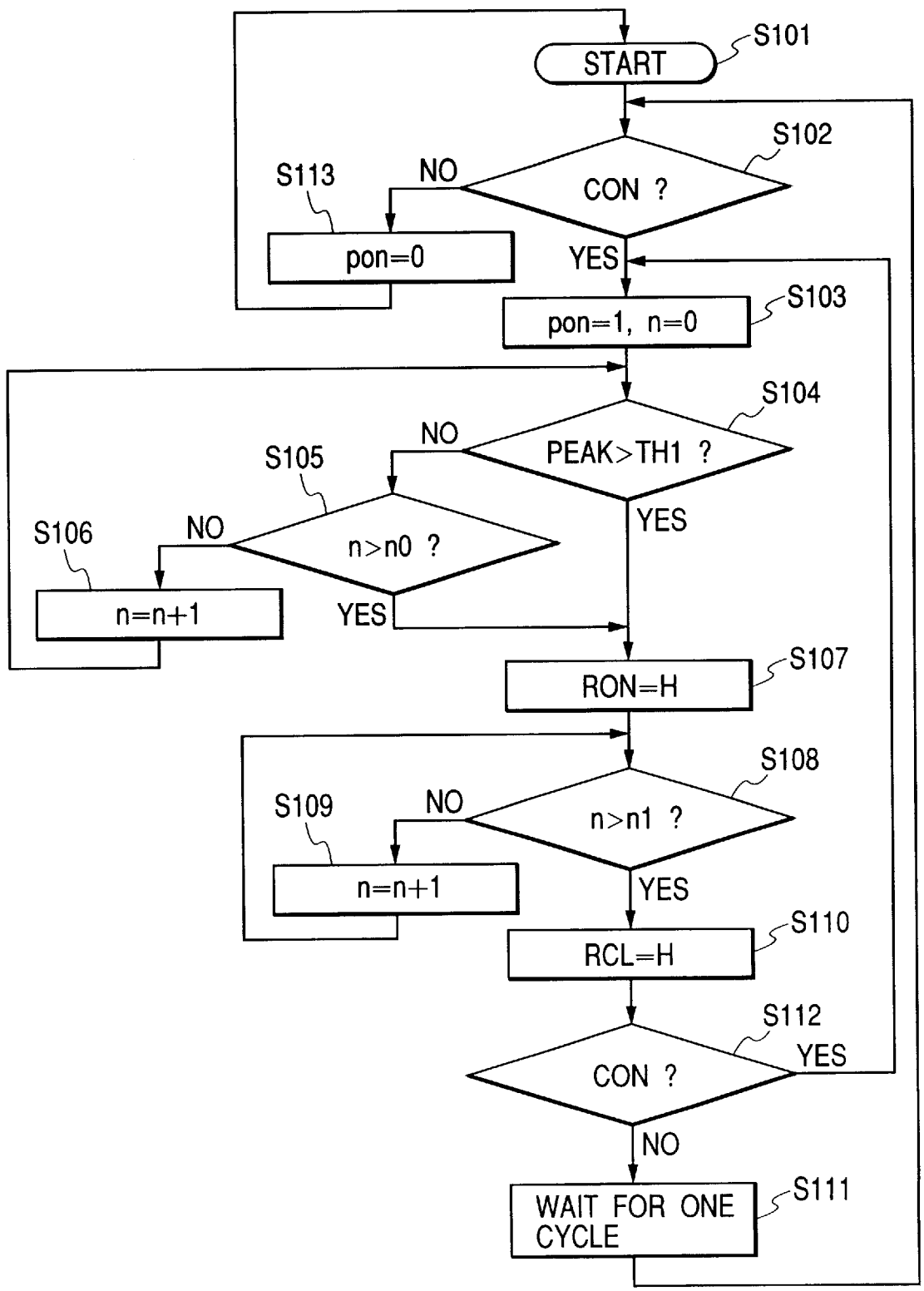
FIG. 8 is a flow chart showing operation control of the linear sensor.

FIG. 8 shows a series of sensor control operations for the linear sensors 20X and 20Y.

The sensor control means 31 starts sensor control operation in step S101, and monitors the signal CON in step S102. If the signal CON changes to high level, the sensor control means 31 resets a counter n to 0 in step S103, and checks in step S104 whether a peak level PEAK of a sensor output is higher than a predetermined value TH1.

If NO in step S104, the sensor control means 31 checks in step S105 whether the counter n exceeds a first predetermined count n0. If YES in step S105, the flow shifts to step S106 to increment the counter n by one after the lapse of one cycle of the signal LCK, and returns to step S104. If YES in step S104 or S105, the flow advances to step S107 to set an integration stop signal RON to high level (H) and stop the integrating operation. Then, the coordinate arithmetic means 32 starts calculating coordinate values.

If the counter n exceeds a second predetermined count n1 in the loop of steps S108 and S109, the integration stop signal RON changes to low level. At the same time, the sensor reset signal RCL changes to high level during several times (twice in FIG. 7) the cycle of the signal LCK. The flow shifts to step S112, and this operation is repeated while the signal CON is at high level. Coordinate values are calculated every cycle determined by the counter value n1.

Step S111 is set to hold the state only once even when the signal CON drops out due to the influence of dust or the like. If the signal CON is kept at low level during two cycles, the flow advances from step S102 to step S113 to reset a flag pon to 0, waits for a sync signal, and returns to step S101.

This dropout can also be prevented by setting the holding time longer than one cycle. If disturbance is little, no dropout measure need be taken. Note that the same operation can be performed even if one cycle is set to a natural number of times the cycle of the above-mentioned data block so as to synchronize with the timing of the sync code, and a sync code detection signal is used instead of the signal CON.

(Sensor Integrating Operation)

Synchronous integrating operation of the linear sensors 20X and 20Y will be explained.

Figure 9:
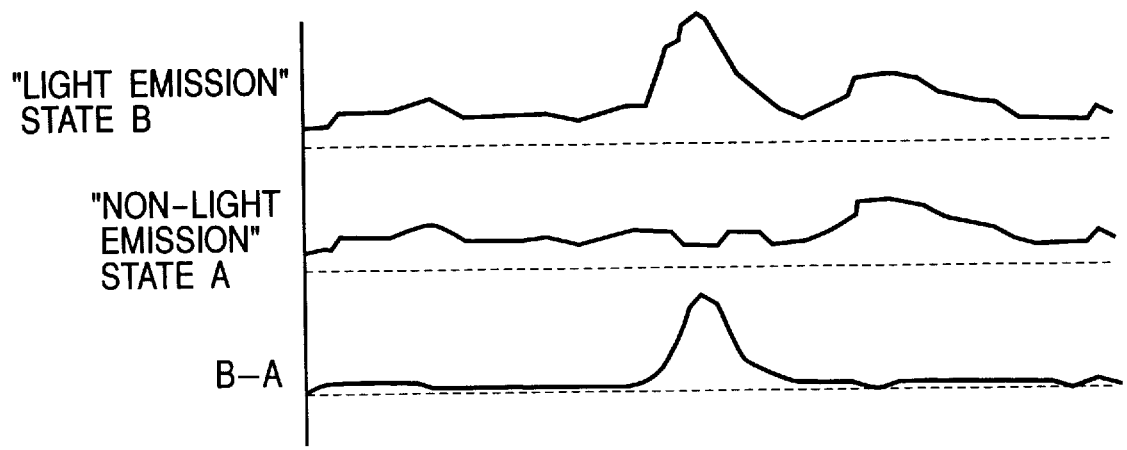
FIG. 9 is a waveform chart showing an example of an output waveform from the linear sensor.

FIG. 9 shows an example of the output waveform of the linear sensors 20X and 20Y. A waveform B is for a read of only a signal in a "light emission" state. A waveform A is in a "non-light emission" state, e.g., for only disturbance light. As shown in FIG. 4, electrical charges of pixels corresponding to the waveforms A and B are stored adjacent to each other in the ring CCD portions 26. The amplifier 29 practically calculates the difference value between adjacent charge amounts, and non-destructively amplifies and outputs the difference value.

The amplifier 29 outputs a waveform B-A to cancel a disturbance light component and suppress noise, thereby obtaining an image signal of only flashing light from the designation unit 4.

The PEAK value signal shown in FIG. 8 corresponds to the maximum value of the waveform B-A. Light repeatedly flashes to sequentially accumulate electrical charges in the ring CCD portions 26 and increase the PEAK value signal. By detecting that the level reaches the predetermined value TH1, a stable output waveform can always be obtained.

Note that this determination may be made separately for the two X and Y coordinate sensors. Since these sensors are laid out very close to each other, they receive almost the same quantity of light, and their output peaks are almost the same. In the first embodiment, an output from only one sensor is used for determination, and completely the same control is performed for the two sensors to simplify the circuit arrangement.

(Sensor Skim Function)

When disturbance light is very strong, the transfer charges of the ring CCD portions 26 may be saturated before the peak of the difference waveform B-A reaches a sufficiently large value. Considering this situation, the sensor comprises a skim portion 28 having a skim function.

Figure 10:
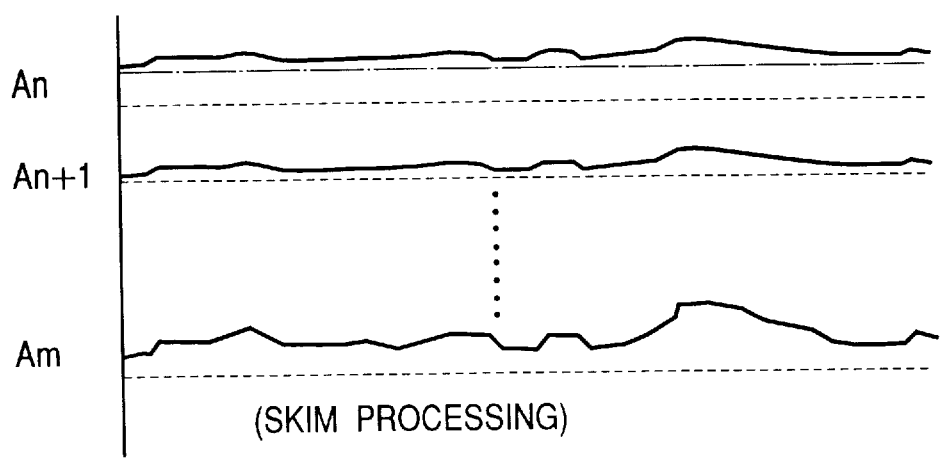
FIG. 10 is a waveform chart showing skim operation of the linear sensor.

FIG. 10 shows operation of the skim function. The skim portion 28 monitors the level of a non-light emission signal, and when the signal level exceeds a predetermined value in the nth An, extracts a predetermined number of electrical charges from pixels corresponding to A and B. In the next (n+1)th An, a waveform An+1 can be obtained. By repeating this operation, signal charges can be continuously accumulated without saturation even with very strong disturbance light. Even if the quantity of flashing light is very small, a signal waveform having a sufficiently large magnitude can be attained by repeating integrating operation many times.

This embodiment adopts a 635-nm semiconductor laser as a flashing light source, and inserts a corresponding optical filter (not shown) in an optical path. In this visible light range, a display image signal is superposed. However, a sharp waveform almost free from noise can be obtained using this skim function and a difference output.

The present invention applies a synchronous integrating function, can flexibly cope with changes in light quantity, and can increase the sampling rate of a coordinate output. Particularly when both a pen type designation unit having an LED used in direct contact with the screen, and a laser pointer are employed, a larger-light-quantity LED can be used. The integral counts n0 and n1 shown in FIG. 1 are determined and switched by an ID signal depending on whether the designation unit is a pen or pointer, and sampling is performed at a high rate for the pen or at a low rate for the pointer. In practice, the pointer is not suitable for fine drawing such as character input, but can draw smooth lines by low-rate sampling. This switching is therefore effective.

(Operation Frequency)

The operation frequencies of respective components used in the first embodiment will be described.

As described above, the cycle of flashing light is 7.5 kHz. When the CCD has 64 effective pixels and the total 68 pixels, the transfer clock on the CCD is about 1 MHz (2×68×7.5 kHz=1.02 MHz), and the sampling frequency of AD conversion for difference data is about 500 kHz which is half the transfer clock.

If the second integral number TH0 of synchronous integrating operations is set to 72, and reset operation spends the time of three integrating operations, the sampling frequency of coordinate data is 100 Hz (7.5 kHz÷75). Even with this very high coordinate sampling frequency, the transfer clock and AD conversion clock suffice to be much lower than in an area sensor. This means that the power consumption and calculation data amount are small.

The light quantity varies owing to not only changes over time in battery voltage and light emitting element but the position of the designation unit 4. Especially when the light diffusion property of the screen 10 is weak, the front brightness of a display image is high, but the input light quantity to the sensor greatly varies depending on the position of the designation unit 4. According to the present invention, the integral number can automatically follow even this situation to always obtain a stable output signal. When a beam from the laser pointer is incident on the sensor without being scattered so much, strong light may enter the sensor. Even in this case, the apparatus can be stably used.

If the light quantity is too large, the discharge function of the integration portions 22 of the sensor can be used to perform so-called electron shutter operation. As mentioned above, the peak value can be easily always kept at constant level by setting an integral number as large as several ten times. For example, if the integral number is smaller than the first set value (e.g., 24), the next electron shutter operation is performed for a short time; if it is larger than the second set value (e.g., 56), the operation is performed for a long time. Under this control, the integral number can always be about half (30 to 50) of TH1, and variations in peak value can be easily suppressed to 5% or less.

(Calculation of Coordinate Value)

Coordinate calculation in the coordinate arithmetic means 32 will be explained.

Output signals from the two linear sensors 20X and 20Y (difference signal from the amplifier 29) obtained in the above fashion are sent as digital signals via the n-bit (8-bit in this embodiment) AD conversion means 31A arranged in the sensor control means 31 to the coordinate arithmetic means 32 where coordinate values are calculated. First, coordinate values (X1,Y1) on the sensor are calculated from output data in the X and Y coordinate directions. Note that the same calculation is performed for X and Y, and only X will be explained.

Figure 11:
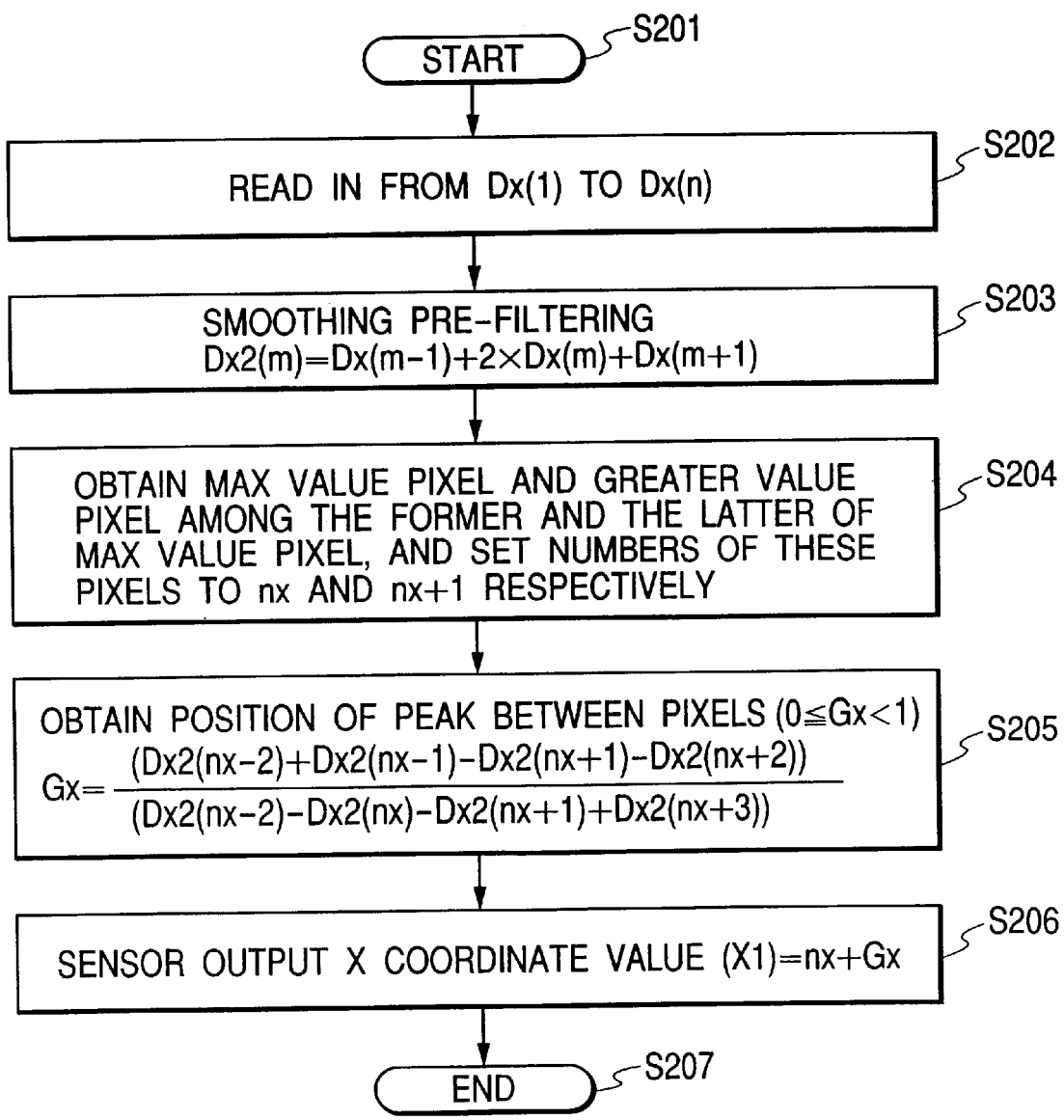
FIG. 11 is a flow chart showing coordinate calculation.

FIG. 11 shows the flow of coordinate calculation. Processing starts in step S201, and difference data Dx(1) to Dx(N) as difference signals of respective pixels are read in and stored in a buffer memory in step S202. In step S203, smoothing pre-filtering Dx2(m) is performed to suppress noise and increase S/N. This is a simple addition known as a neighborhood operator (1,2,1).

In step S204, a max value pixel and a greater value pixel among the former and the latter of the max value pixel are detected, and the numbers of these pixels are respectively set to nx and nx+1. In step S205, an accurate position of the peak between the pixels is obtained using (1,1,0,-1,-1) as a kind of differential operator. This calculation, which obtains a zero-crossing point of a differential waveform, can be rearranged into a very simple form:

$$Gx = \frac{(Dx2(nx-2) + Dx2(nx-1) - Dx2(nx+1) - Dx2(nx+2))}{(Dx2(nx-2) - Dx2(nx) - Dx2(nx+1) + Dx2(nx+3))} \quad (1)$$

for $-0.5 < Gx \leq 0.5$

In step S206, the calculated coordinates Gx between the pixels and the pixel number nx are added to obtain a sensor output X coordinate value X1.

This calculation method using differential is superior to barycentric calculation because a DC offset can be ignored. A division is performed only once, so that the calculation amount is very small. Although a necessary precision of the calculated coordinate between the pixels depends on the sharpness and distortion of an image signal, a precision of ½₀ pixel or less can be attained, and the division corresponding to 4 to 5 bits can be realized.

Generally, in this position detection, an image is preferably as sharp as possible. However, the present invention intentionally makes an image out of focus by focus adjustment so as to make the image width several times the pixel. Experiments using a 1.5-mm-φ plastic cylindrical lens, a linear CCD with a pixel pitch of about 15 μm and 64 effective pixels, and an infrared LED reveal that the sharpest image formed had an image width of 15 μm or less over the entire screen having a view angle of about 40°, and in this state inter-pixel division results distorted stepwise. The lens position was therefore adjusted to set an image width to about 30 to 60 μm, thereby obtaining very smooth coordinate data. Since the peak level decreases if an image is made effectively out of focus, an optimum image width is about 2 to 3 pixels. One of points of the present invention is to use a CCD with a small number of pixels and an properly defocused optical system. This combination can realize a high-resolving-power, high-precision, high-speed, and low-cost coordinate input apparatus with a small calculation data amount using a small sensor and optical system.

(Calibration of Coordinate Value)

Figure 12:
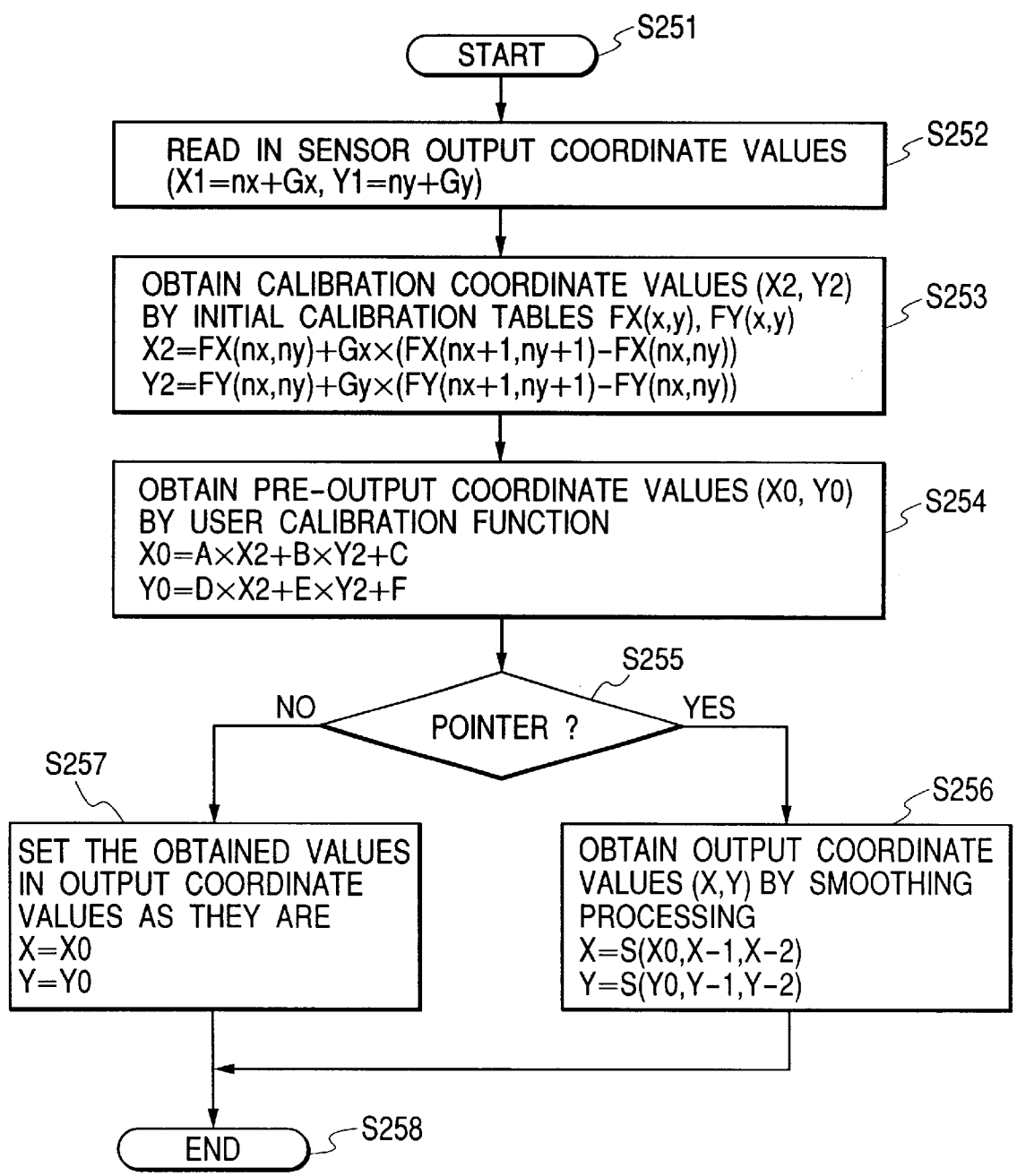
FIG. 12 is a flow chart showing coordinate calibration.

FIG. 12 shows calibration of the coordinate values X1 and Y1 obtained by the above calculation.

In step S252, sensor output coordinate values X1=Gx+nx and Y1=Gy+ny are obtained. Subsequently, coordinates are calibrated. One calibration is to correct distortion of the optical system such as curvature of field. The other calibration is correction corresponding to user tastes or changes in installation state.

In step S253, distortion of the optical system is mainly corrected. Calibration tables FX and FY are set in advance in the manufacture. This embodiment adopts only calibration tables corresponding to the number of pixels in order to decrease the table size. Values FX(nx,ny) and FX(nx+1,ny+1) are read out using nx and ny as upper bits of the sensor output coordinate values. A calibration coordinate value X2 is obtained by linear interpolation for the lower bit Gx. The Y coordinate is similarly calculated.

The X coordinate is calibrated using the sensor coordinate Y1 because optical distortion depends on a position in the Y direction even with the same X coordinate. Since two-dimensional calibration tables are necessary for X and Y, it is very effective to decrease the number of calibration points, like the first embodiment. Note that numerical values stored in the calibration tables FX and FY are distortion amounts from the reference position. However, these values are much smaller in the CCD than in an analog device such as a PSD, only lower 2 to 4 bits are sufficient, and the data amounts of the calibration tables can be greatly decreased. This distortion is an aberration of the optical system or an assembly error, and thus is almost 0 near the center. If calibration points are set at only peripheral portions, the number of calibration points can be further decreased. The distortion can be practically canceled by a combination of distortion and characteristics of the projection optical system.

In step S254, the second calibration is performed using a user calibration function to obtain pre-output coordinate values (X0,Y0). This user calibration is conversion by a simple linear function. The coefficient of this function is determined as a solution of simultaneous equations with three unknowns (for four points or more, a fitting method such as the least squares method is used) by designating three points (or more) by the user on a predetermined screen in a calibration value setting mode when, e.g., the installation state is to change.

Installation calibration by the user is generally performed in the coordinate input apparatus and is not unique to the present invention, so a description thereof will be omitted. This is an indispensable function particularly when installation is often changed as in a front projection type projector.

In step S255, whether smoothing processing in the time axis direction is performed is checked depending on the mode. More specifically, the stability of the user hand is different between the case of using the designation unit 4 like a pen and the case of using it apart from the screen as a pointer. When the designation unit 4 is used as a pointer, the cursor on the screen slightly trembles, and this slight tremble is desirably suppressed. When the designation unit 4 is used like a pen, it faithfully, quickly follows the movement of the user hand as much as possible. Especially in writing characters, they cannot be correctly input unless the designation unit 4 quickly operates.

In this embodiment, since an ID is transmitted by a control signal, whether the designation unit 4 is of a pointer type and the switch at the distal end is depressed can be determined. It is then determined whether the designation unit 4 is used as a pointer. If the designation unit 4 is a pointer, a moving average is calculated in step S256 using preceding and second preceding output coordinate values (X−1,Y−1) and (X−2,Y−2), thereby obtaining current output coordinate values (X,Y). If the designation unit 4 is not a pointer, (X0,Y0) are set in step S257 as output coordinate values (X,Y) as they are.

The first embodiment adopts a simple moving average. Alternatively, as a function used in this smoothing processing, various methods can be used such that a difference absolute value is nonlinearly compressed by its size, or the difference between the moving average and its predicted value is nonlinearly compressed. In the present invention, since the stability of an output coordinate is electrically high, a sufficiently stable output can be attained without smoothing processing for a pen type designation unit 4. Depending on user tastes, however, smoothing may be preferably performed to a certain degree. In this case, the user of a designation unit 4 in use is determined by his ID, and smoothing is switched for a smaller smoothing effect than for the pointer. In short, smoothing can be switched by a control signal to be relatively strong when the designation unit 4 is used as a pointer, otherwise, to be relatively weak. A convenient state can be realized, which is a great effect of the present invention.

Note that these calculation processes suffice to complete only within 10 msec for a coordinate sampling frequency of 100 Hz, as described above. Since original data is as very small as 64 pixels×2 (X and Y)×8 bits, and no convergence calculation is required, these processes can be satisfactorily achieved by a low-speed, 8-bit, 1-chip microprocessor. This is advantageous in cost, facilitates changes in specifications, shortens the development period, and easily develops various derivative goods. No LSI dedicated for high-speed image data processing need be developed, unlike in the use of an area sensor, and the development cost and period can be greatly reduced.

(Output of Coordinate Value)

A data signal representing the coordinate values (X,Y) obtained by the above calculation is sent from the coordinate arithmetic means 32 to the communication control means 33. The communication control means 33 receives the data signal and a control signal from the control signal detection means 72. Both the data and control signals are converted into communication signals in a predetermined format and transmitted to an external display control device. Then, the user can perform various operations for the cursor and menus on the screen 10 and input of characters and line drawings. As a result, a coordinate input apparatus which can obtain a resolving power of 1,000 or more even when a sensor having 64 pixels is used, as described above, and uses only a low-cost, compact sensor and optical system and a very compact arithmetic circuit can be realized.

The numbers of pixels and calculation data required to double the resolving power are four times when the sensor is constituted as an area sensor, but the numbers of pixels for the X and Y coordinates can be twice when the sensor is constituted as a linear sensor. A larger resolving power can therefore be attained by increasing the number of pixels.

(Second Embodiment)

The second embodiment of the present invention will be described with reference to FIGS. 13 and 14. The same reference numerals as in the first embodiment denote the same parts, and a description thereof will be omitted.

In the second embodiment, the transfer clock of a CCD and the AD conversion clock of an AD conversion means 31A that constitute a coordinate detection sensor portion 2 are further decreased by changing the light flashing control method. That is, transmission data is divided into 5-bit burst data, and this burst data is transmitted in a predetermined cycle and used as a flash cycle of synchronous integration.

Figure 13:
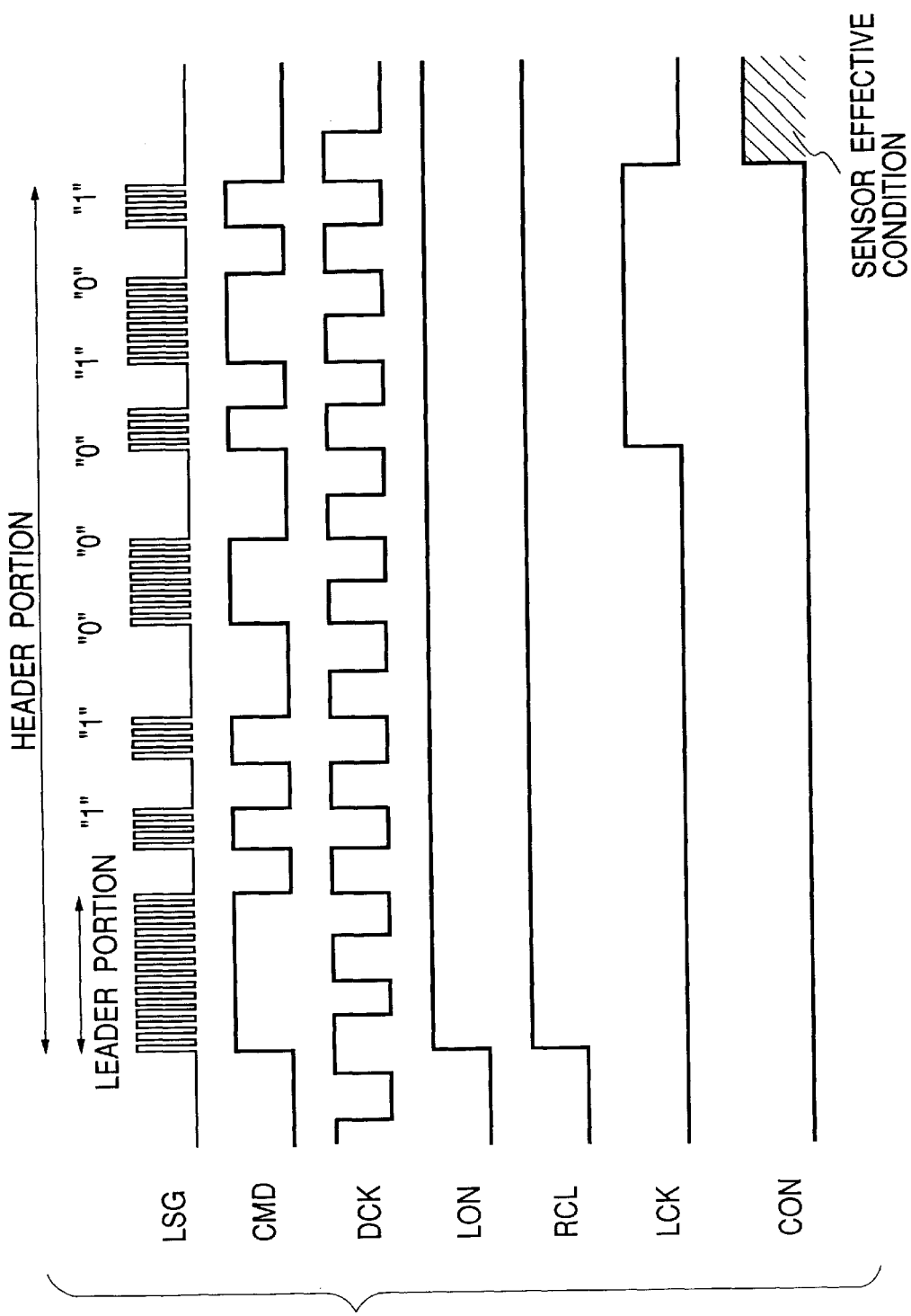
FIG. 13 is a timing chart of signal waveforms representing operation of decoding a control signal from an output signal of the light receiving element in the second embodiment of the present invention.

FIG. 13 shows an example when a control signal is decoded from an output signal of a light receiving element 6. That is, FIG. 13 shows a signal waveform of a header portion immediately after the switch of a designation unit 4 is turned on to start input.

Similar to the above-described embodiment, light is modulated by a carrier having a first frequency of 60 kHz, and 1-bit data is transmitted using ⅛ of this frequency, i.e., 7.5 kHz as a unit. Transmission data is encoded by a format in which data is inverted always at a center bit and even at the head for "1". A header signal is made up of a 2-bit leader portion and a predetermined 8-bit pattern and can be reliably detected. A 5-bit idle period and 5-bit data are successively transmitted.

Figure 14:
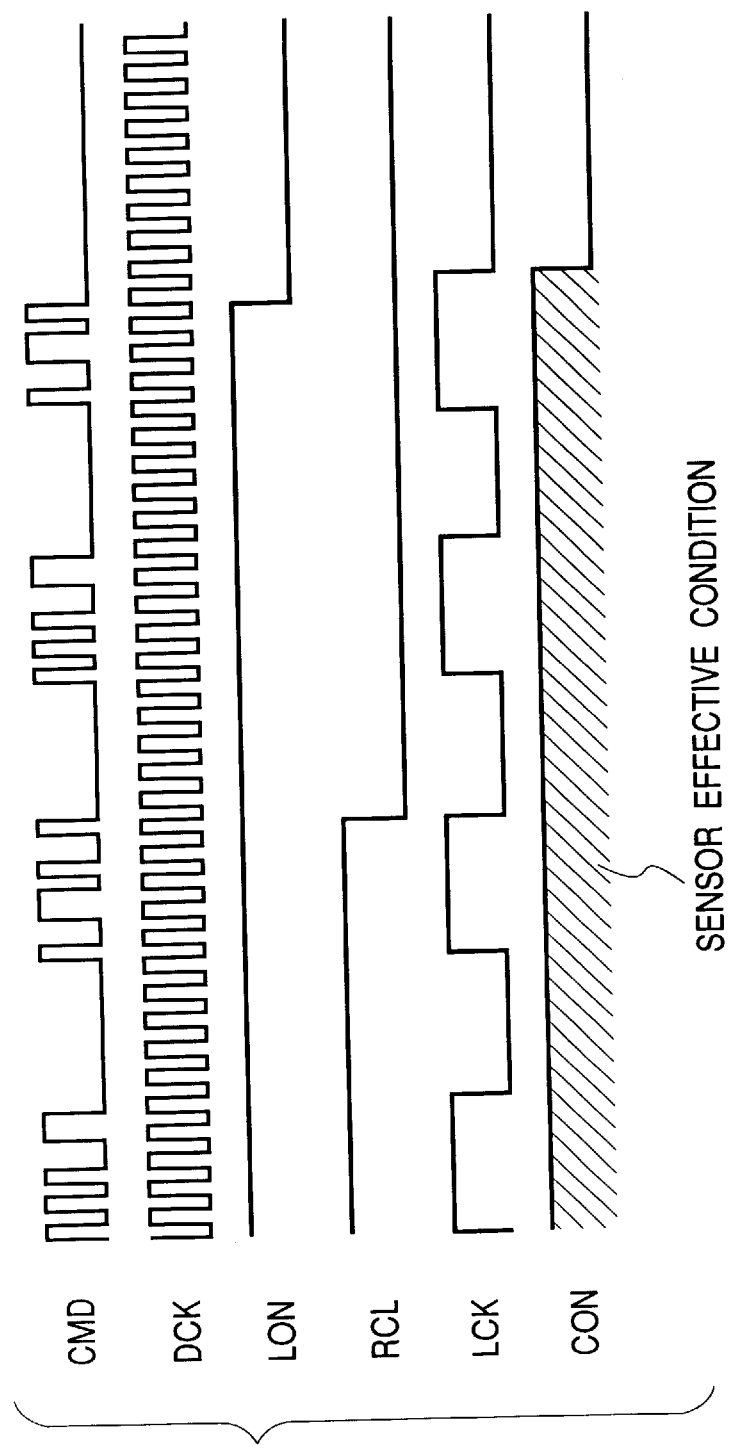
FIG. 14 is a timing chart at the end of a series of operations of decoding a control signal from an output signal of the light receiving element.

FIG. 14 shows an example of an operational timing at the end of a series of operations of decoding a control signal from an output signal of the light receiving element 6.

Operation of a coordinate detection unit 1 will be explained.

As shown in FIGS. 13 and 14, a data clock signal DCK is generated by a phase lock means from a signal CMD as an output from a frequency detection means 71. The data clock signal DCK is used to decode a control signal. The data clock signal DCK is divided into 10 cycles to generate a signal LCK, which is used to control a CCD.

As shown in FIG. 13, the signal LCK is output at the middle of the 10-bit header portion to ensure the timing. After the header portion is completely detected, the signal CON is set to high level to start integrating operation of CCDs in linear sensors 20X and 20Y.

As shown in FIG. 14, data is transmitted in units of 5 bits to start synchronous integration by the signal LCK in synchronism with the data. When the integral frequency is 750 Hz, the coordinate sampling frequency is 75 Hz with a maximum integral number of 8 by using one cycle for each of a read and a charge reset operation.

In this case, the peak level may vary about 20%, which does not pose any serious problem as far as a proper calculation method is employed, as described in the first embodiment. If the total number of pixels of the CCD is 68, the transfer clock is about 100 kHz (2×68×750 Hz), and the AD conversion clock is about 50 kHz. Sampling can be achieved by even a low-speed AD converter incorporated in a microcontroller. This can decrease the number of components and can increase S/N by a decrease in frequency.

In the second embodiment, data is transmitted in units of 5 bits but may be transmitted in units of 2 bits by properly selecting the ratio of the integral number to the sampling frequency.

Note that in the above description, calibration processing and smoothing processing are performed in the coordinate detection unit. Instead, user calibration and smoothing processing can also be performed by an externally connected device (computer) to obtain substantially the same effects. In this case, the apparatus of the present invention enables switching using an ID signal, as a matter of course. When user calibration and smoothing processing are performed by the externally connected device (computer), the shape of a designation position mark is generally changed depending on software in use. By using both the positional relationship with display contents and an ID signal, attributes including line color and thickness and the degrees of user calibration and smoothing processing can be changed in combination with each other. The apparatus becomes more convenient, and its application range becomes wider.

As has been described above, according to the present invention, signals in the "light emission" and "non-light emission" states of light flashed by the designation unit in a predetermined cycle are separately integrated to obtain a difference signal. The difference signal is digitized at a data width of n bits or more to perform coordinate calculation, thereby outputting a coordinate value having a resolving power having about the nth power of 2 of the number of sensor pixels. The position of a peak pixel can be obtained with high precision, and the interval between pixels can be divided with a high-quality image signal to obtain coordinate values with a high resolving power. Accordingly, a high-resolving-power, compact, lightweight, low-cost apparatus which suppresses the influence of disturbance light can be realized.

According to the present invention, a high-frequency carrier is superposed on flashing light, and the timing of integrating operation is controlled by a modulated signal having a predetermined cycle that is prepared by detecting the frequency of the carrier. The designation unit and image convey portion can synchronize with each other by a cordless scheme, which improves the operability. By using a laser beam, the apparatus can be easily operated at a position apart from the screen.

Further, according to the present invention, the integration means comprises a skim means for removing a predetermined number of electrical charges. Saturation of electrical charges in the integration means can be prevented to stably obtain a high-quality light spot image signal even with very strong disturbance light.

Moreover, the present invention employs an integration control means for detecting that the peak level in a difference signal from the integration means exceeds a predetermined level and stopping integrating operation. Even if the light quantity changes, a light spot image signal at almost constant level can be generated, thereby always obtaining coordinate calculation results at a high resolving power.

What is claimed is:

1. A coordinate input apparatus which irradiates a predetermined position on a coordinate input screen with light from a designation unit to form a light spot, and detects the light spot by a coordinate detection unit to generate a coordinate output signal corresponding to the predetermined position on the coordinate input screen, comprising:

light emitting control means, arranged in the designation unit, for flashing the light spot in a predetermined cycle;

integration means arranged in the coordinate detection unit and constituted by a sensor array prepared by aligning in a line a plurality of photoelectric conversion sensors for detecting the light spot, and a ring-like charge transfer portion for separately integrating signals in light emission and non-light emission states output in synchronism with the predetermined cycle of the light spot from the sensor array;

image sensing means arranged in the coordinate detection unit and having difference means for obtaining a difference signal from the signals in light emission and non-light emission states; and coordinate arithmetic means for digitizing the difference signal between light emission and non-light emission states output from said image sensing means at a data width not less than n bits to perform coordinate calculation, thereby calculating a coordinate value having a resolving power substantially the nth power of 2 of the number of pixels of the sensor array.

2. An apparatus according to claim 1, wherein the coordinate detection unit further comprises:

detection means for detecting high-frequency flashing by the light spot; and control means for controlling a timing of integrating operation by said integration means using the high-frequency signal detected by said detection means.

3. An apparatus according to either one of claims 1 and 2, wherein said image sensing means further comprises skim means for removing a predetermined number of electrical charges from transferred electrical charges.

4. An apparatus according to claim 3, wherein said coordinate arithmetic means further comprises integration control means for detecting that a peak level in the difference signal exceeds a predetermined value, thereby stopping integrating operation of said integration means.

5. An apparatus according to claim 4, wherein a width of an image of the light spot formed on said image sensing means is adjusted to be larger a width of a pixel of the photoelectric conversion sensor.

6. A coordinate input method comprising:

the light emission control step of irradiating a predetermined position on a coordinate input screen with light from a designation unit to form a light spot, and flashing the light spot in a predetermined cycle;

the detection step of detecting the light spot by a sensor array prepared by aligning a plurality of photoelectric conversion sensors in a line;

the integration step of separately integrating signals in light emission and non-light emission states output in synchronism with the predetermined cycle of the light spot from the sensor array by integration means formed from a ring-like charge transfer portion;

the difference step of obtaining a difference signal from the signals in light emission and non-light emission states which are integrated in the integration step;

the coordinate value arithmetic step of digitizing the difference signal at a data width not less than n bits to perform coordinate calculation, thereby calculating a coordinate value having a resolving power substantially the nth power of 2 of the number of pixels of the sensor array; and the output step of outputting the coordinate value calculated in the coordinate value arithmetic step as a coordinate output signal corresponding to the predetermined position on the coordinate input screen.

7. A method according to claim 6, further comprising:

the detection step of detecting high-frequency flashing by the light spot; and the control step of controlling a timing of integrating operation in the integration step using the high-frequency signal detected in the detection step.

8. A method according to either one of claims 6 and 7, wherein the integration step further comprises the skim step of removing a predetermined number of electrical charges from transferred electrical charges.

9. A method according to claim 8, further comprising the integration control step of detecting that a peak level in the difference signal exceeds a predetermined value, thereby stopping integrating operation in the integration step.

10. A method according to claim 9, wherein a width of an image of the light spot formed on the sensor array is adjusted to be larger a width of a pixel of the photoelectric conversion sensor.

11. A computer-readable storage medium which stores a program comprising:

a light emission control code for irradiating a predetermined position on a coordinate input screen with light from a designation unit to form a light spot, and flashing the light spot in a predetermined cycle;

a detection code for detecting the light spot by a sensor array prepared by aligning a plurality of photoelectric conversion sensors in a line;

an integration code for separately integrating signals in light emission and non-light emission states output in synchronism with the predetermined cycle of the light spot from the sensor array by integration means formed from a ring-like charge transfer portion;

a difference code for obtaining a difference signal from the signals in light emission and non-light emission states which are integrated by the integration code;

a coordinate value arithmetic code for digitizing the difference signal at a data width not less than n bits to perform coordinate calculation, thereby calculating a coordinate value having a resolving power substantially the nth power of 2 of the number of pixels of the sensor array; and an output code for outputting the coordinate value calculated by the coordinate value arithmetic code as a coordinate output signal corresponding to the predetermined position on the coordinate input screen.

12. A coordinate input apparatus which detects a light source of a designation unit by a coordinate detection unit to generate a coordinate output signal corresponding to a predetermined position on a coordinate input screen, comprising:

light emitting control means, arranged in the designation unit, for flashing the light source in a predetermined cycle;

integration means, arranged in the coordinate detection unit, for separately integrating signals in light emission and non-light emission states output in synchronism with the predetermined cycle of the light source from a sensor array prepared a plurality of photoelectric conversion sensors for detecting the light source;

image sensing means arranged in the coordinate detection unit and having difference means for obtaining a difference signal from the signals in light emission and non-light emission states; and coordinate arithmetic means for digitizing the difference signal between light emission and non-light emission states output from said image sensing means to perform calculation, thereby calculating a coordinate value having a resolving power higher than a number of pixels of the sensor array, wherein said integration means is comprised of a ring-like charge transfer portion.

13. An apparatus according to claim 12, wherein said plurality of the photoelectric conversion sensors of the sensor array are aligned in a line.

14. An apparatus according to claim 12, wherein said coordinate arithmetic means digitizes the difference signal between light emission and non-light emission states output from said image sensing means at a data width not less than n bits to perform coordinate calculation, thereby calculating a coordinate value having a resolving power substantially the nth power of 2 of the number of pixels of the sensor array.

15. A coordinate input method which detects a light source of a designation unit by a coordinate detection unit to generate a coordinate output signal corresponding to a predetermined position on a coordinate input screen, comprising the steps of:

light emitting control step, arranged in the designation unit, for flashing the light source in a predetermined cycle;

integration step, arranged in the coordinate detection unit, for separately integrating signals in light emission and non-light emission states output in synchronism with the predetermined cycle of the light source from a sensor array prepared a plurality of photoelectric conversion sensors for detecting the light source;

image sensing step arranged in the coordinate detection unit and having a difference step for obtaining a difference signal from the signals in light emission and non-light emission states; and coordinate arithmetic step for digitizing the difference signal between light emission and non-light emission states output from said image sensing step to perform calculation, thereby calculating a coordinate value having a resolving power higher than a number of pixels of the sensor array, wherein said integration step is comprised of a ring-like charge transfer portion.

16. A method according to claim 15, wherein said plurality of the photoelectric conversion sensors of the sensor array are aligned in a line.

17. A method according to claim 15, wherein said coordinate arithmetic step digitizes the difference signal between light emission and non-light emission states output from said image sensing step at a data width not less than n bits to perform coordinate calculation, thereby calculating a coordinate value having a resolving power substantially the nth power of 2 of the number of pixels of the sensor array.

* * * * *

UNITED STATES PATENT AND TRADEMARK OFFICE
CERTIFICATE OF CORRECTION

PATENT NO.     : 6,229,601 B1
DATED          : May 8, 2001
INVENTOR(S)    : Masahide Hasegawa It is certified that error appears in the above-identified patent and that said Letters Patent is hereby corrected as shown below:

<u>Column 5,</u>
Line 55, "10" should read -- 43A --.

<u>Column 6,</u>
Line 13, "10," should read -- 43A, --.

<u>Column 16,</u>
Lines 17 and 61, "larger a" should read -- larger than --.

Signed and Sealed this

Twenty-sixth Day of February, 2002

Attest:

JAMES E. ROGAN
Attesting Officer — Director of the United States Patent and Trademark Office